United States Patent
Eichenauer

[15] 3,650,131
[45] Mar. 21, 1972

[54] IGNITION AND STEERING LOCK FOR MOTOR CAR

[72] Inventor: Rudolf Eichenauer, Hollbergstrasse 1, 6 Frankfurt/M, Germany

[22] Filed: Dec. 15, 1969

[21] Appl. No.: 885,390

[30] Foreign Application Priority Data

Dec. 17, 1968 Germany ...................... P 18 15 152.5
Feb. 11, 1969 Germany ...................... P 19 06 731.7
July 14, 1969 Germany ...................... P 19 35 629.7

[52] U.S. Cl. ................................................................ 70/252
[51] Int. Cl. ............................................................ B60r 25/02
[58] Field of Search ................................... 70/252; 200/44

[56] References Cited

UNITED STATES PATENTS 1,592,091   7/1926   Fairchild ............................. 70/252
2,063,088  12/1936   Fitzgerald ........................... 70/252

FOREIGN PATENTS OR APPLICATIONS 1,081,367   8/1967   Great Britain ..................... 70/252
1,539,404   8/1968   France ................................ 70/252

Primary Examiner—Albert G. Craig, Jr.
Attorney—Kurt Kelman

[57] ABSTRACT

A combined ignition and steering lock for automotive vehicles including means for simultaneously actuating the ignition system and a steering mechanism arresting bolt, and means operable on location of a key in the opening to lock the arresting bolt out of engagement with the steering mechanism.

16 Claims, 11 Drawing Figures

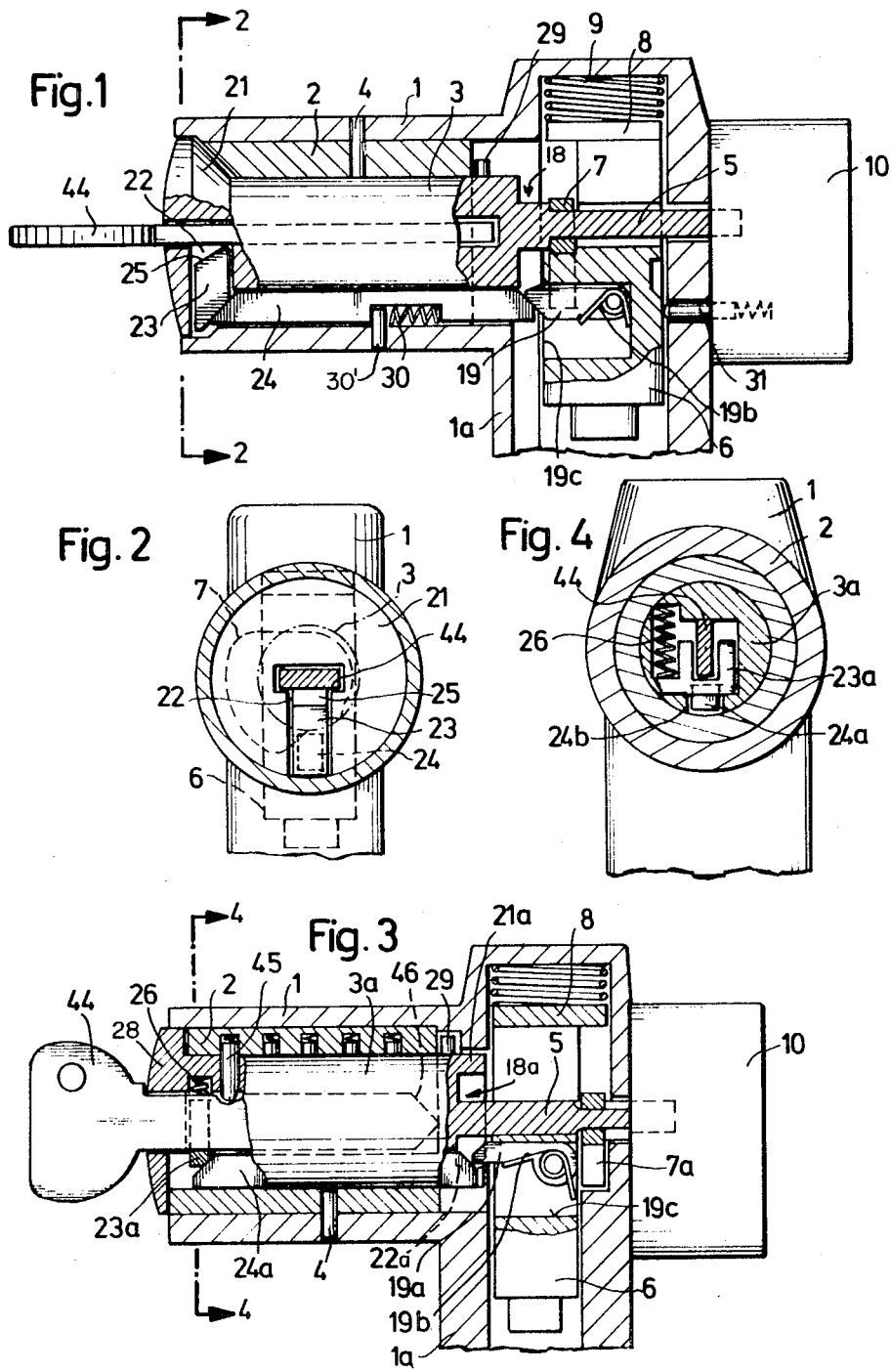

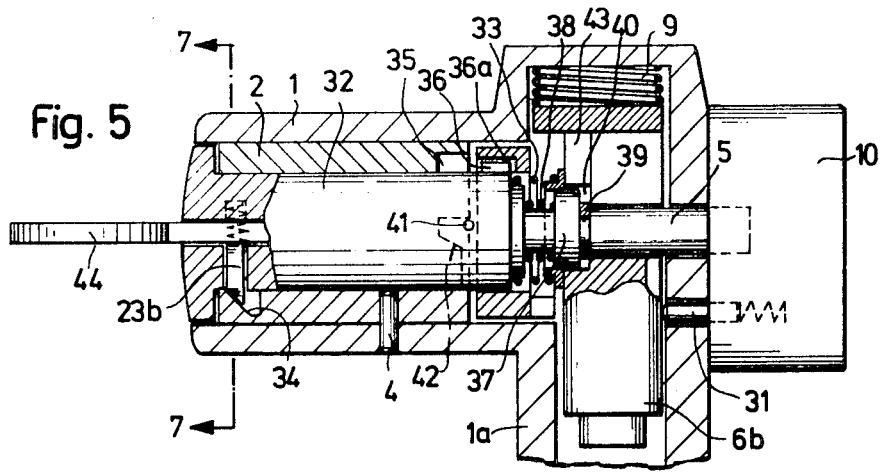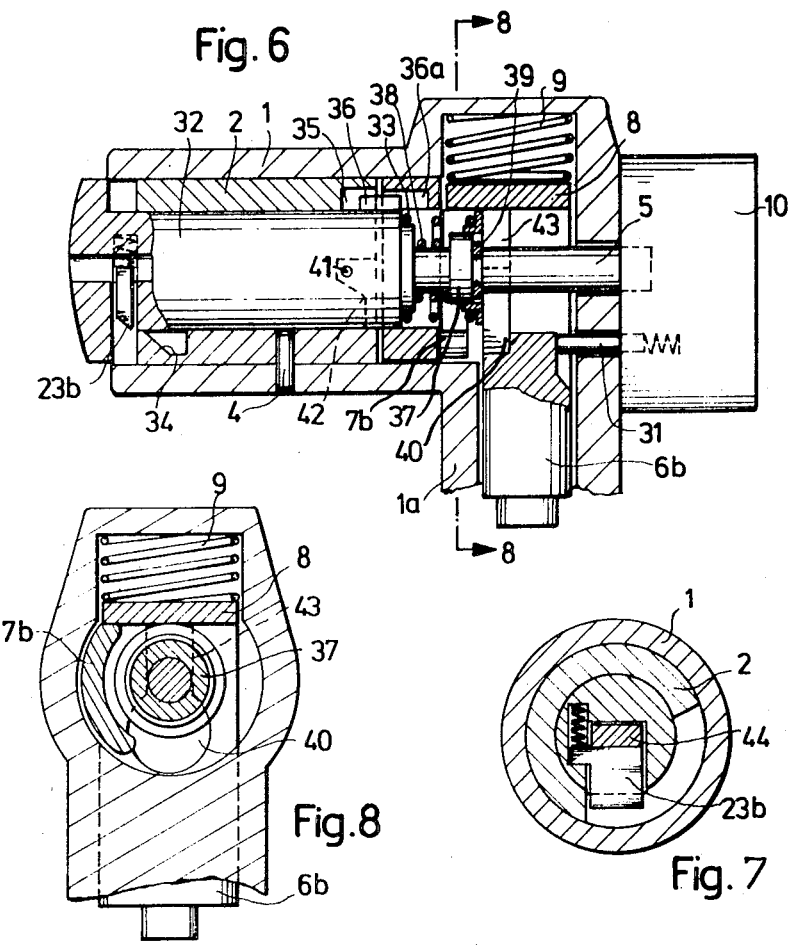

IGNITION AND STEERING LOCK FOR MOTOR CAR

The present invention relates to a combined steering and ignition lock for a motor vehicle and the like.

In general, locks of this type comprise a slotted lock cylinder mounted for free rotation within a housing which is provided with locking tumblers mating with the cylinder and releasable by insertion of a key within the slot. The cylinder is operable jointly to actuate the ignition switch and a steering mechanism arresting member between ON, OFF and STOP positions.

Conventionally, the arresting member comprises a bolt movable into and out of engagement with a recess in the steering column by a drive mechanism actuated by the lock cylinder when it is rotated in a predetermined angular direction. The arresting member is generally spring biased so that, when the lock is in the OFF or STOP positions and the key is removed, the bolt arrests the operation of the steering mechanism. However, since it is sometimes necessary to permit the steering mechanism to be operable even though the ignition is turned off, a control element is operable by the key to maintain the bolt retracted and out of engagement with the mechanism. The control element has, in the prior art devices, been operable by the insertion of the key fully into the slot of the lock cylinder. In these prior art devices, since it was necessary to place the control element directly in contact with the bolt, the slightest displacement of the key from its fully inserted position, even the merest fraction of an inch, results in the release of the control element and the subsequent engagement of the bolt with the steering mechanism. Such displacement can easily be caused by vibration of the vehicle, inadvertent dislodgement by the operator or passenger and/or severe angular attitude of the vehicle, as in climbing steep hills. The displacement of the key and the immediate locking of the steering mechanism creates a serious hazard and has, in fact, resulted in a number of fatal accidents.

It is accordingly an object of the present invention to provide a safe, secure and improved combination steering and ignition lock.

It is a further object of this invention to provide a combined steering and ignition lock for a vehicle which cannot be inadvertently displaced from its holding position.

It is yet another object of the invention to provide a combined ignition and steering column lock for a vehicle in which the steering mechanism cannot be arrested unless the key is fully withdrawn from the cylinder.

These and other objects as well as numerous advantages will be fully apparent from the following description.

According to the present invention, there is provided a combined ignition and steering lock for an automotive vehicle having an ignition switch movable between an open locked position and at least one closed position, and a resiliently biased bolt normally engaging and arresting the movement of the steering mechanism of the vehicle and movable in and out of engagement therewith. The lock comprises a housing and a lock cylinder rotatable in the housing, the cylinder having a key slot and an opening for the key at the rear end thereof. The cylinder is provided with an axle extending outwardly of the forward end and operatively connected to the switch and the bolt for jointly moving them. A control mechanism has a pawl mounted on the axle and adapted to be engaged with the bolt when the bolt is lifted, and a latch mechanism extends to the key opening at the rear end of the cylinder, the latch being adapted to secure the pawl when the key is inserted into the lock.

In the preferred form, the cylinder is provided with a collar radially extending about it and in which is formed a gap adapted to receive both the pawl and the latch mechanism, the latch mechanism forcing the pawl above the rim of the collar so as to be maintained by the collar in any rotary position of the cylinder, and the latch being released from the gap on removal of the key to permit the pawl to be disengaged from the collar. The collar may be placed either at the rearward or the forward end of the cylinder with the appropriate linkages to either the pawl or to the key opening.

In another embodiment of the invention, the cylinder is mounted within the housing so as to be both axially and rotatively movable with regard to the housing. A latch is also provided in this embodiment to maintain the locking pawl in position.

In a third embodiment, the cylinder is provided with a locking bolt separable from its extending axle which is adapted to slide into and out of engagement with the steering mechanism. The locking bolt also provides some of the functions of the latch device previously noted.

In the following detailed description of some now preferred embodiments of the present invention, reference is made to the accompanying drawing wherein FIG. 1 is a longitudinal sectional view of a lock embodying the principles of the present invention;

FIG. 2 is a sectional view along lines 2—2 of FIG. 1;

FIG. 3 is a view similar to FIG. 1 and showing a modified form of a lock embodying the principles of the present invention;

FIG. 4 is a sectional view along line 4—4 of FIG. 3;

FIG. 5 is a sectional view of still another embodiment;

FIG. 6 is a view showing the embodiment of FIG. 5 with the key withdrawn;

FIG. 7 is a sectional view taken along line 7—7 of FIG. 5;

FIG. 8 is a sectional view taken along line 8—8 of FIG. 6;

Figure 9:
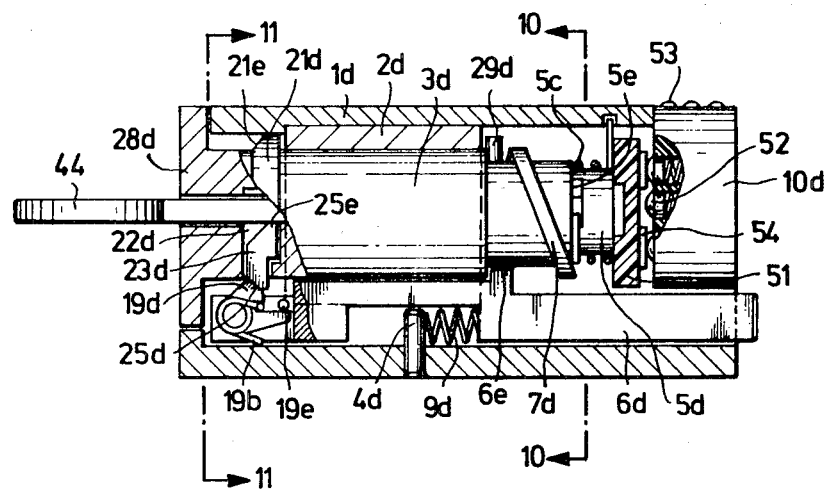
FIG. 9 is a view of a lock showing a fourth embodiment.
Figure 10:
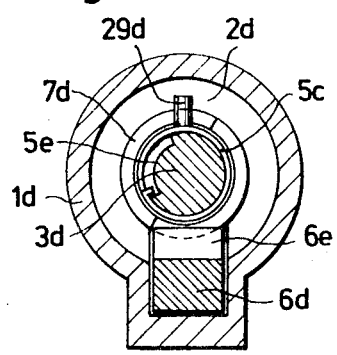
Figure 11:
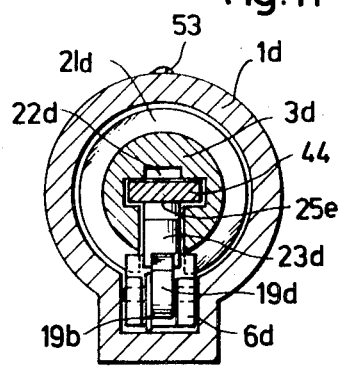

FIGS. 10 and 11 are sectional views taken along lines 10—10 and 11—11, respectively, of FIG. 9.

FIGS. 1-4 show two embodiments of the present invention which are essentially similar in structure and have only minor differences. Consequently, it will be more efficient and concise to describe the two embodiments simultaneously. Numerals in parenthesis denote modified parts of the embodiment of FIGS. 3 and 4.

Turning now to these respective figures, the lock of the present invention, mounted in association with a steering column of a motor vehicle (neither of which are shown), is contained in an L-shaped housing in which one of the legs 1 holds the lock cylinder 3 (3a in FIG. 3) while the other leg 1a holds the bolt 6 which extends therefrom into engagement with a recess (not shown) in the steering column.

A bearing sleeve 2 is mounted within the leg 1 and is constrained from axial movement by one or more pins 4 radially extending in suitable recesses into the sleeve 2. Rotatably mounted within the bearing sleeve 2 is the lock cylinder 3 (3a) having a key slot at its rear end and a longitudinal axle 5 extending from its forward end into an ignition switch mechanism 10.

Mounted about rotatable with the axle 5 is drive cam 7 (7a), and the axle is received in a bore formed in the bolt 6. The bolt 6 is mounted at right angles to the lock cylinder 3 in the leg 1a; in which it is adapted to reciprocate, moving its outer end into and out of engagement with a suitable recess formed in the steering mechanism. The bolt 6 is provided with a cam follower plate 8.

The drive cam 7 (7a) has an eccentric shape and generally radial extent and is thereby adapted to engage the inner surface of the plate 8 at preselected times on the rotation of the lock cylinder 3 so as either to retract the bolt 6 within the leg 1a or permit it to extend outwardly of the leg 1a. A compression spring 9 bears on the outer surface of the plate 8 so as normally to bias the bolt 6 in extended position into engagement with the steering column. The axle 5 extends beyond the bore of the bolt 6 and into engagement with the selected contacts of the ignition switch 10. Consequently, on rotation of the lock cylinder 3, the cam 7 (7a) operates the bolt 6 while the axle 5 simultaneously operates the ignition switch 10.

In the embodiment of FIG. 1, a split collar 21 having a radial gap 22 situated in its circumference is mounted at the rear end of the lock cylinder 3. The collar 21 extends radially beyond the circumference of the cylinder 3 and is provided with a bevelled face corresponding to the rear face of the bearing sleeve a so that it may be freely rotatable with respect thereto.

The forward edge of the cylinder 3 is cut back to provide an annular space 18 about the extending axle 5 between the cylinder 3 and the cam 7.

Mounted within a longitudinally extending slot, so as to be nonrotatable, in the bearing sleeve 2 is a latch 24 having a beveled edge at its forward and rear end. The latch 24 is urged into a forward position into the space 18 by a spring 30 held by a radial pin 30. The rear end of the latch 24 enters into the radial gap 22 formed in collar 21 and, as will be more fully explained later, is movable forward of the cylinder 3 by action of a transverse slide 23 on insertion of a key 44 in the lock slot.

In the embodiment shown in FIG. 3, a collar 21a is formed as an arcuate rim on the front end of cylinder 3a, the outer surface of which is radially coextensive with the lock cylinder 3a. The collar 21a defines an annular space 18a surrounding the axle 5. A sliding latch 24a has a beveled rear end passing through radial gap 22a in collar 21a and is movable forwardly into space 18a by U-shaped slide 23a which is transversely biased by spring 26 against the beveled forward end of latch 24a.

A pivotal pawl 19 (19a) is mounted in a vertical slot 19c formed in the bolt 6 below its bore and has one end extending rearwardly in the direction of the lock cylinder 3 (3a) and into the annular groove 18 (18a). The pawl 19 (19a) is provided with a sear spring 19b which normally acts to bias the pawl into the annular space or opening 18 (18a). The pawl 19 is further provided at its outer or rearward tip with inclined surfaces on its top and bottom to permit it to slide over the collar 21a (FIG. 3) or sliding latch 24 (FIG. 1). Conveniently, the edges of the rim of collar 21a are also provided with slightly inclined or bevelled surfaces to accommodate this movement.

Operatively, when a key 44 is inserted into the lock cylinder 3 (3a) and employed to rotate the cylinder, the drive cam 7 rides against the cam follower plate 8. The bolt 6 is lifted out of engagement with the steering column and into a retracted position in the housing leg 1a. The pawl 19 (19a) at first rides with its upper edge on the outer surface of the rear end of latch 24 or collar 21a and pivots downwardly into the slot 19c against the action of the sear spring 19b. However, as the bolt continues to move upwardly, the pawl 19 (19a) passes the edge of latch 24 or collar 21a and snaps inwardly into the space 18 or 18a. In FIG. 1, the pawl 19 is held in this position since, the sliding latch 24 is maintained forwardly by action of the transverse slide 23 in radial gap 22 of collar 21 on the rear end of the latch 24.

The ceiling of the slot 19c prevents the pawl 19 (19a) from pivoting beyond a horizontal position, as shown in FIGS. 1 and 3. Other conventional stop means, such as a fixed pin, may be provided. Thus, since the pawl 19 cannot be further pivoted upwardly, nor move downwardly once it enters the space 18 or 18a it acts to maintain the bolt 6 to which it is fixed in its retracted position, irrespective of the position of the drive cam 7 (7a) which, as may be seen later, can now be removed from engagement with the plate 8, thereby placing the ignition switch system in OFF position while maintaining the steering column mechanism operative.

In the above manner, the vehicle may be placed in operation by insertion of key 44 to operate the ignition and unlock the steering mechanism. To turn off the ignition and lock the steering wheel, provision must be made to enable the pawl 19 (19a) which, as noted, does not pivot upwardly beyond the horizontal, to be disengaged from latch 24 (24a) so that the bolt 6 may be forced outwardly into extended arresting position. To this end the latch 24 (24a) is slidable into the gap to move rearwardly into the gap, thus permitting the bolt 6 to move downwardly. In the embodiment shown in FIG. 3, the collar 21a is provided with a gap 22a. On rotation of the gap 22a of collar 21a into alignment with the pawl 19a, the pawl is permitted to slide downwardly through the gap 22, thus enabling the stronger force of spring 9 to force latch 24a back against the weaker bias of spring 26 and to move the bolt 6 into an extended position.

The predetermined position of the collar gap 22 (22a) corresponds not only to the point where the bolt 6 may be permitted to move but also the point where the ignition system 10 will simultaneously be turned off. This is necessary in order to enable the vehicle to be simultaneously prevented from steering and prevented from motor operation in the stop or halt position.

Since, as noted earlier, it is often necessary to provide for the operation of the steering system without the ignition system, it is necessary to provide in the present device means for allowing the placing of the ignition system in the OFF position while permitting the steering mechanism to be operative. To this end, the elongated latch 24 (24a) is mounted between the forward and rear ends of the cylinder 3 (3a) for sliding parallel to the longitudinal axis of the cylinder. In the embodiment shown in FIG. 1, the latch 24 is non rotatably mounted within a slot formed in the bearing sleeve 2 and is normally biased into engagement with the pawl 19 being held there by the action of the bevelled forward face of transverse slide 23. In the embodiment shown in FIG. 3, the latch 24a is mounted within a similar slot formed in the lock cylinder 3a itself and is rotatable with it.

In the embodiment shown in FIG. 1, the latch 24 is actuated by a transversely movable actuating slide 23 located at the keyhole entrance or rearmost end of the lock. The actuating slide 23 is slideably mounted in a slot extending radially from the key slot of cylinder 3 to the slot containing the latch 24 (see FIG. 2). The actuating slide 23 has inclined top edge 25 and a similar bottom edge which gives it a wedge-type configuration. The top edge 25 is adapted to enter into the key slot of cylinder 3 and to be engaged by the flat surface or side of a key 44, as shown in FIG. 1. When it is engaged by the key 44, it is moved radially outward from the central axis of the cylinder 3 into engagement with the rearmost end of the latch 24 which is correspondingly inclined so that the bottom edge of the actuating slide 23 and rearmost edge of the latch 24 slidingly engage with each other. Consequently, on entrance of the key 44 into the cylinder 3, the actuating slide 23 abuts against the edge of the latch 24, wedging it forward in the axial direction into the space 18 thus insuring the maintenance of the pawl 19 in upward or retracted position.

On removal of the key 44, the pawl 19, now moving downwardly under the force of the spring 9, acts on the forward edge of the latch 24, causing it to move axially to the rear, overcoming the effect of the biasing spring 30. The rear edge of the latch 24 slides against the bottom edge of the actuating member 23, pushing it radially inwardly of the cylinder 3. As a result, the latch 24 clears the space 18, permitting the bolt 6 to move to its extended position.

The rearward movement of the latch 24 can only be accomplished with the complete removal of the key 44 from the cylinder 3 since, as long as any part of the key remains in the slot, the transverse actuating slide 23 cannot be moved radially inwardly of the cylinder 3 and will consequently maintain the latch 24 fixed firmly in the space 18. So long as latch 24 extends into space 18, the pawl 19 cannot be moved. Advantageously, whether or not the key is used to rotate the cylinder 3 to cause the axle 5 to shut off the ignition switch, the bolt 6 remains retracted and out of engagement with the steering mechanism. Consequently, vibratory effects on the key, steep movement of the vehicle, or inadvertent dislodgement of the key will have no effect on the movement of the latch 24, provided that at least some part of the key remains within the cylinder 3. This feature provides a fail-safe operation.

In the embodiment shown in FIG. 3, the actuating slide 23 of FIG. 1 is replaced with a U-shaped member 23a the cross piece or bight of which engages with the rear end of the slide 24a. The movement of the transverse slide member 23a is actuated by the bottom edge of the key 44 rather than the side edge. Conveniently, the internal portion of the member 23a can be made with a node or wedged shape which may be made to cooperate with forward pointed edges 46 of the key member 44. In this manner, the pointed edges 46 operate to depress or move the transverse slide 23a immediately on the insertion of the key and maintain the slide in that displaced position until the extreme forward edge 46 of the key is removed from the cylinder 3a. A further advantage is obtained with the present construction since it is now possible to put a spring loading or resilient bias on the key 44 itself other than the normal bias exerted by the tumblers 45, as for example shown in FIG. 3. The key can thus be prevented from jarring loose or vibrating within the cylinder. To this end, the transverse actuating slide 23a may be provided with a spring 26 which biases the slide normally into the key slot of the cylinder 3a. Thus, as soon as the key 44 is inserted into the slot, this biasing force constrains the vibration or movement of the key 44. Of course, the spring will be chosen so as to exert the required force against the key without presenting any obstacle or interfering with the key's insertion into the cylinder 3a. A stop pin 29 limiting axial movement between the cylinder 3a and the sleeve 2 is placed at the forward end. The rearward end of the cylinder 3a is also provided with its radially flanged head 28.

Attention can now be turned to the embodiments depicted in FIGS. 5–8. In these embodiments, a lock cylinder 32 is arranged to be axially slideable within the bearing sleeve 2 so as to perform one of the functions of the latch 24 shown in the previous embodiments. A groove within the bearing sleeve 2 has an oblique cam face 34 at its keyhole or rearward end and a transverse actuating slide 23b is seated therein by action of a spring. The actuating slide 23b has an inclined forward edge slidingly engaging over the oblique surface 34 and a flat edge extending within the key slot formed in the cylinder 32 in a manner similar to that shown in the embodiment of FIG. 1. The actuating slide 23b is engaged by the flat side surfaces of the key 44 so as to be moved in a radial gap in lock cylinder 32, into engagement with the groove in fixed bearing sleeve 2, as seen in FIG. 7.

Extending in the leg 1a of the housing is a steering column arresting mechanism comprising a bolt 6b movable between an extended position into engagement with the steering mechanism and a retracted position against the spring 9. The slide 6b differs from the slide 6 shown in FIG. 1 and 3 in that its transverse bore 40 is of a radially smaller dimension and is provided with a vertical slot 43 communicating with the upper edge of the bore 40. Between the forward end of the cylinder 32 and the rearward side of the bolt 6b is positioned a compression spring 33 which acts to bias the cylinder 32 in the rearward direction. The forward end of the cylinder 32 and bolt 6b provide seats for retaining the spring 33 in an axial position about the axle 5 extending from the cylinder 32. Thus in order to engage the actuating slide 23b with the oblique face 34 of the fixed bearing sleeve 2, the cylinder 32 must itself be axially moved inwardly against the bias of the spring 33 so that the transverse member 23b is raised over the rearward edge of the fixed member 2 on the insertion of the key.

Actuating slide 23b is normally biased to obstruct the passage of the key in the slot of the cylinder 32. Thus, as the key is inserted, its forward tip abuts the transverse slide 23b, pushing the entire cylinder 32 forwardly until the end of the transverse slide rides over the end of the fixed bearing sleeve 2 and engages the oblique surface 34 (See FIG. 5). At this point, the key is inserted all the way into the cylinder 32, and the cylinder 32 may then be rotated.

The driving means for the bolt 6b comprises a cam 7b formed on an annular member or sleeve placed directly over the forward end of the cylinder 32. The sleeve of the drive means is keyed to the cylinder for conjoint rotation and relative axial movement. This keying may be conveniently provided by forming on the cylinder one or more longitudinal projecting fins 36 and on the inner surface of the annular collar or sleeve member of the drive cam 7b cooperating longitudinal fins 36a. The bearing sleeve 2 is provided with a suitable cutout 35 to accommodate the fins 36 when the cylinder 32 is moved axially, so that the cylinder disengages from the cam 7b.

Slidably mounted on the axle 5 is a locking pawl 37 which abuts against a washer 39 secured within a groove formed in the axle 5. A compression spring 38 is mounted coaxially with spring 33 between the end of the lock cylinder 32 and the pawl 37 so as to maintain the pawl 37 normally abutting against the washer 39. However, the resiliency of the spring 38 permits the rearward movement of the locking pawl 37 when so abutting.

Rotation of the cylinder 32 by the key 44 drives the cam member 7b into engagement with the under surface of the plate 8 in the manner previously described, and acts to lift the bolt 6b. Simultaneously, the action of the spring 38 forces the locking pawl 37 against previously noted circular bore 40 and a vertically extending slot 43 of the bolt 6b. The pawl 37 first abuts against the vertical portion 43 and, as the bolt 6b rises, then enters into the circular portion 40. As the pawl 37 is forced to enter into the bore 40 when the bolt 6b is in its most elevated position, as seen in FIG. 5, it will maintain the bolt 6b in this elevated position. This state exists so long as a key 44 remains in the slot of the cylinder 32 since the actuating slide 23b will remain locked within the oblique face 34, preventing the rearward movement of the cylinder 32. Rotation or counterrotation of the cylinder 32 and cam 76 at this point will not affect the action of the pawl 37 on the slide 6b.

A pin 41 extends radially outwardly of the cylinder 32 into a shaped groove 42 formed in the inner surface of the bearing sleeve 2. The groove 42 has a first portion in the shape of a V, the apex of which extends toward the rear of the lock and a second portion extending arcutely therefrom in a peripheral or arcuate section transverse to the axis of the cylinder. The V-shaped section permits relative movement between the cylinder 32 and the surrounding bearing sleeve 2 within defined limits while the arcuate section permits only rotative movement within defined limits. As seen in FIG. 6, when the lock is in the rest or unused position, that is, without a key inserted therein, the pin 41 abuts against the apex portion of the slot. However, as seen in FIG. 5, when a key is inserted therein and the cylinder pushed forward, the pin 41 abuts against the arcuate wall of the section 42. In FIG. 5, this position is seen prior to rotation. When the cylinder is thereafter rotated, the pin 41 limits the rotation by inserting itself between the walls of the arcuate section of the groove 42. Since the arcuate groove portion limits the axial movement of the pin 41, the rotation of the cylinder 32 can be made without any axial movement.

The embodiment shown in FIGS. 5 to 8 operates quite similarly to the embodiments previously described in that, when the key is inserted into the lock, it actuates an actuating slide 23b, at the same time enabling the cylinder to be rotated so as to have a pawl 37 lock the bolt 6b in its retracted position simultaneously with the actuation of the ignition system. The oblique face 34 of the groove in fixed sleeve 2 engages the slide 23b, maintaining the locked position until the key is removed entirely. Subsequently, the cylinder 32 may be rotated. However, so long as the key 44 remains in the cylinder, the rotation of the cylinder 32 will only deactivate the ignition system without removing the pawl 37 from engagement with the bolt 6b and, consequently, without causing the bolt 6b to extend itself and engage with the steering mechanism.

As can be seen from FIG. 6 on removal of the key from the cylinder, the locking pawl 37 is no longer in engagement with bolt 6b. This is possible since the transverse slide 23b is removed from engagement with the oblique face 34 of the latch by the bias of the spring 33. The entire cylinder 32 moves outwardly to the rear of the lock. The spring 33 causes the cylinder 32 and the axle 5 to carry the pawl 37 out of engagement with the bore 40 of the slide 6b.

In each of the embodiments shown in FIGS. 1–8, the ignition system is provided with an acoustical warning signal mechanism which may be actuated by a pin 31. The pin 31 is mounted in the housing leg 1a and is spring loaded against the forward side of the bolt 6 or 6b. Under normal conditions, the pin 31 is adapted to ride within a slot or groove formed in the bolt 6 (6b) so that, when the bolt 6 (6b) is in engagement with the steering mechanism the signal switch is deactivated. However, when the bolt 6 (6b) is maintained in retracted position and the ignition system is placed in OFF position, the alarm signal is adapted to indicate that the steering gear is operative and that a key has remained in the lock.

Still another form of the present invention is shown in FIGS. 9 through 11. This embodiment is particularly adapted to form a bayonet type of arrangement in which the lock assembly is made in the form of a single cylindrical assembly and may be simply plugged into an appropriate receptacle in the steering housing. Turning to FIG. 9, the device comprises the usual cylindrical housing 1d, bearing sleeve 2d and lock cylinder 3d. The arresting member or bolt 6d is located in a slot formed in the bearing sleeve 2d along a line parallel to the axis of the cylinder 3d and is adapted to reciprocate into and out of the forward end of the housing. A spring 9d is secured by a pin 4d in a cutout portion of the bolt 6d and biases the bolt normally outwardly into engagement with the steering mechanism (not shown). At the rear or keyhole end, the cylinder 3d is provided with an annular head 28d having a keyhole aligned with the slot of the cylinder.

Integrally formed about the cylinder 3d inwardly of the head 28d is a radially extending collar 21d, opposed to which, on the bolt 6d is mounted a pawl 19d which functions both as latch (such as 24) and bolt retaining pawl (such as 19). The latching pawl 19d is provided with a sear spring 19b which normally pivots the pawl counterclockwise into engagement with the oblique rim 25d slide 23d moving in a radial gap 22d of collar 21d. The pawl 19d is limited in clockwise rotation by a stop 19e. The outwardly oblique face 25d of the transverse actuating slide 23d is adapted to be positioned against the oblique face of the locking pawl 19d when the lock cylinder 3d is placed in the locking position while the radially inward end 25e of the actuating slide 23d is resiliently biased to normally extend within the key slot of the cylinder 3d. The insertion of the key 44 into the lock forces the slide 23d radially outward against the pawl 19d.

A drive cam 7d is employed to retract or pull back the bolt 6d against the force of the spring 9d when the lock cylinder 3d is turned. The cam 7d is then brought adjacent to the cam follower 6e of bolt 6d and moves the bolt 6d rearwardly from the steering mechanism arresting position to the position seen in FIG. 9. A helical spring 5c is mounted about the axle 5d extending forwardly from the lock cylinder and is fixed at one end in the housing 1d and at the other end in the recess 5e formed in the periphery of the lock cylinder. The helical spring 5d serves to return the lock cylinder automatically to the starting position while the recess 5e allows the helical spring 5c to slip, permitting the cylinder 3d to rotate during the various positions required for ON, OFF or STOP and to be automatically returned to its starting position. A position limit pin 29d extends radially from the cylinder 3d and provides the limit means whereby the lock cylinder 3d may be limited in its rotation.

Mounted on the axle 5d is a disc 51 formed of insulating material having arranged on its forward face a plurality of concentrically formed contact ridges 54. The contact disc 51 is arranged parallel to a switch-type bushing 10d on which there are a plurality of spring loaded electrical contacts 52 arranged to face and correspondingly selectively to engage with the ridges 54. Electrically connected to each of the spring loaded contacts 52, on the peripheral edge of the bushing 10d, are a corresponding number of contacts 53. The contacts 53 are exposed on the outer surface of the lock and correspond in number to an equal number of socket members placed within the steering column receptacle for the cylinder so that the lock may be inserted within the receptacle and the contacts 53 engage with their respective contacts.

Operatively, the embodiment shown in FIGS. 9–11 functions in the following manner: Proceeding from the STOP position indicated in FIG. 9 wherein the bolt 6d is in retracted position and when the key is removed, the spring 19b presses the oblique face of the pawl 19d against transverse slide 23b which, being free of engagement with the key 44, now moves radially into the cylinder slot. The bolt 6d is thus free to move and is pressed into its arresting position with the steering mechanism by action of the spring 9d. Since the transverse slide 23d is now no longer spring biased, the key may be inserted without obstacle and move the transverse actuating slide 23d out of its path and fully into the gap 22d in the collar 21d.

When the locking cylinder 3d is subsequently rotated to actuate the ignition, the cam 7d engages the cam follower 6e, pulling the bolt 6d rearwardly At this point, the rear edge of the latching pawl 19d engages the collar 21d and moves downwardly against the action of the spring 19b. As soon as the full ignition ON position is reached, the latching pawl 19d reaches the oblique position shown in FIG. 9. The front face of the latching pawl 91d engages with the oblique face 35d of the slide 23d and slides on this face during continued rotation. In this manner, the bolt 6d is retained in its pull back or retracted position even when the cam 7d is no longer in contact with the projection 6e of the bolt, as when the spring 5c returns the cylinder to its starting position. This state will remain so so long as the key 44 remains in the lock and maintains the actuating slide 23d in engagement with the face of the pawl 19d.

When the lock is to be returned into the steering mechanism locked position, that is with the bolt 6d in engagement with the steering mechanism, the ignition of the car is first deactivated by rotating the lock cylinder. The locking pawl 19d is at this point no longer situated behind the collar 21d but is aligned with the oblique face 25d of the transverse slide 23d which is still blocked against movement in the gap 22 by the retention of the key in the lock. This situation will of course remain so long as the key remains in the cylinder. As soon as the key is removed the slide 23d is permitted to move, disengaging from the face of the pawl 19d, which may then permit the bolt 6d to extend forwardly under influence of the spring 9d.

I claim:

1. A combined ignition and steering mechanism lock for an automotive vehicle with an ignition switch movable between a locked open position and at least one closed position, comprising
   1. a housing;
   2. a lock cylinder mounted for rotation in the housing about an axis of the cylinder, the lock cylinder having
      a. a forward end,
      b. a rear end,
      c. a radial gap in the rear end, and
      d. a key slot extending axially through the rear end and towards the forward end of the cylinder for receiving a key, the radial gap being in communication with the slot;
   3. a bolt mounted in the housing for movement between an operative position wherein it engages and arrests the steering mechanism and an inoperative position wherein it is disengaged therefrom;
   4. spring means normally biasing the bolt into the operative position thereof;
   5. means extending forwardly of the forward end of the lock cylinder and rotatable therewith by the key inserted into the key slot into a first position to operate the ignition switch and simultaneously to move the bolt into its inoperative position to free the steering mechanism, and into a second position to turn off the switch; and
   6. a control mechanism for securing the bolt in the inoperative position as long as the key remains inserted at least in the rear end of the key slot, the control mechanism including
      a. a latch means axially movable between an operative position wherein the latch means engages the bolt in its inoperative position and an inoperative position of the latch means wherein the latch means is out of engagement with the bolt and permits the bolt to assume its operative position under the bias of the spring means, the springnbiased movement of the bolt moving the latch means into its inoperative position; and b. a latch means actuating slide mounted in the radial gap of the lock cylinder for transverse movement in respect to the key slot, the actuating slide having an oblique edge facing the key slot and being pressed against a flat side of the key inserted thereinto by the spring-biased movement of the bolt.

2. The ignition and steering mechanism lock of claim 1, wherein the latch means has an oblique face and the actuating slide has a matching oblique face for engagement therewith.

3. The ignition and steering mechanism lock of claim 1, further comprising a cam means rotatable with the lock cylinder and arranged to engage the bolt for movement thereof into the inoperative position when the cylinder is rotated into its first position and out of engagement with the bolt for permitting its movement into the operative position in the second position of the cylinder.

4. The ignition and steering mechanism lock of claim 3, wherein the actuating slide is arranged for said transverse movement in the radial gap into a first position wherein the key presses the slide into engagement with the latch means for holding the bolt in its inoperative position and into a second position out of engagement with the latch means in the second position of the cylinder and when the key is removed from the key slot, and a concentric circular bolt engaging means associated with the cylinder and arranged to hold the bolt in its inoperative position in the second position of the cylinder and when the key is removed.

5. A combined ignition and steering mechanism lock for an automotive vehicle with an ignition switch movable between a locked open position and at least one closed position, comprising 1. a housing;
2. a lock cylinder mounted for rotation in the housing about an axis of the cylinder, the lock cylinder having
   a. a forward end,
   b. a rear end,
   c. a radial gap in the rear end, and
   d. a key slot extending axially through the rear end and towards the forward end of the cylinder for receiving a key, the radial gap being in communication with the key slot;
3. a bolt mounted in the housing for movement between an operative position wherein it engages and arrests the steering mechanism and an inoperative position wherein it is disengaged therefrom,
   a. a pawl on the bolt;
4. spring means normally biasing the bolt into the operative position thereof;
5. means extending forwardly of the forward end of the lock cylinder and rotatable therewith by the key inserted into the key slot into a first position to operate the ignition switch and simultaneously to move the bolt into its inoperative position to free the steering mechanism, and into a second position to turn off the switch; and
6. a control mechanism for securing the bolt in the inoperative position as long as the key remains inserted at least in the rear end of the key slot, the control mechanism including
   a. an elongated latch movable parallel to the lock cylinder axis between an operative position wherein a forward end of the latch engages the bolt pawl to hold the bolt in its inoperative position and an inoperative position of the latch wherein the forward end of the latch is out of engagement with the bolt pawl and permits the bolt to assume its operative position under the bias of the spring means, the spring-biased movement of the bolt moving the latch into inoperative position, and
   b. a latch actuating slide mounted in the radial gap of the lock cylinder for transverse movement in respect to the key slot, the actuating slide having one end engageable with the rear end of the latch and another end arranged to enter into the key slot and to be engaged by a key inserted thereinto, whereby insertion of the key moves the slide into engagement with the rear end of the latch for moving the latch into a position for engagement with the pawl upon retraction of the bolt to secure the bolt in the inoperative position.

6. The ignition and steering mechanism lock of claim 5, further comprising a fixed bearing sleeve secured in the housing, the lock cylinder being rotatably mounted in the bearing sleeve, the elongated latch being mounted slidably in a slot formed in the bearing sleeve and thereby fixed against rotation, and a concentric circular collar forming the rear end of the lock cylinder.

7. The ignition and steering mechanism lock of claim 6, wherein the ends of the slide, the ends of the latch and an end of the pawl engaging the forward end of the latch are oblique for respective wedging engagement with each other and with the key, respectively.

8. A combined ignition and steering mechanism lock for an automotive vehicle with an ignition switch movable between a locked open position and at least one closed position, comprising 1. a housing;
2. a lock cylinder mounted for rotation in the housing about an axis of the cylinder, the lock cylinder having
   a. a forward end,
   b. a rear end,
   c. a radial gap in the rear end, and
   d. a key slot extending axially through the rear end and towards the forward end of the cylinder for receiving a key, the radial gap being in communication with the slot;
3. an axle extending forwardly of the forward end of the lock cylinder to the ignition switch and rotatable therewith by the key inserted into the key slot into a first position to operate the ignition switch and simultaneously to move the bolt into its inoperative position to free the steering mechanism, and into a second position to turn off the switch; and
4. a bolt mounted in the housing for movement between an operative position wherein it engages and arrests the steering mechanism and an inoperative position wherein it is disengaged therefrom,
   a. the axle extending through a recess in the bolt to permit the movement thereof;
5. spring means normally biasing the bolt into the operative position;
6. a cam mounted on the axle within said recess for moving the bolt to said inoperative position against the spring bias upon rotation of the cylinder into its first position; and
7. a control mechanism for securing the bolt in the inoperative position as long as the key remains inserted at least in the rear end of the key slot, the control mechanism including
   a. a concentric circumferential rim at the forward end of the lock cylinder adjacent the bolt and extending in a plane substantially parallel thereto, the rim defining an annular recess about the axle and having a radial gap in its circumference,
   b. a pawl mounted on the bolt and arranged to engage the edge of the rim and to enter the annular recess for secure engagement therein when the bolt is in the inoperative position, and the radial gap in the rim permitting the pawl to disengage therefrom in the second position of the lock cylinder,
   c. an elongated latch movable parallel to the lock cylinder axis between an operative position wherein a forward end of the latch passing through the radial gap engages the bolt pawl to hold the bolt in its inoperative position and an inoperative position of the latch wherein the latch is out of engagement with the bolt pawl and permits the bolt to assume its operative position under the bias of the spring means, the spring-biased movement of the bolt moving the latch into its inoperative position, and d. a latch actuating slide mounted in the radial gap of the lock cylinder for transverse movement in respect to the key slot, the actuating slide having one end engageable with the rear end of the latch and another end arranged to enter into the key slot and to be engaged by a key inserted thereinto, whereby insertion of the key moves the slide into engagement with the rear end of the latch for moving the latch into a position for engagement with the pawl upon retraction of the bolt to secure the bolt in the inoperative position.

9. The ignition and steering mechanism lock of claim 8, wherein the pawl is resiliently biased to move away from the rim on the bolt moving to its inoperative position and to snap over the rim when the bolt assumes the inoperative position, the pawl being fixed against pivoting movement in the bolt.

10. The ignition and steering mechanism lock of claim 8, further comprising spring means normally biasing the latch actuating slide into the key slot for forcible engagement with a key inserted thereinto.

11. The ignition and steering mechanism lock of claim 8, wherein the latch is mounted within the lock cylinder and is rotatable therewith.

12. A combined ignition and steering mechanism lock for an automotive vehicle with an ignition switch movable between a locked open position and at least one closed position, comprising
1. a housing;
2. a lock cylinder mounted for rotation in the housing about an axis of the cylinder and for axial movement between a forward and rear position, the lock cylinder having
   a. a forward end,
   b. a rear end,
   c. a radial gap in the rear end,
   d. a key slot extending axially through the rear end towards the forward end of the cylinder for receiving a key, the radial gap being in communication with the key slot, and
   e. an axle extending forwardly of the forward end and axially movable and rotatable therewith by the key inserted into the key slot into the forward position to operate the ignition switch;
3. a bolt mounted in the housing for movement between an operative position wherein it engages and arrests the steering mechanism and an inoperative position wherein it is disengaged therefrom,
   a. the bolt having a transverse recess wherethrough the axle extends to the ignition switch;
4. a spring means normally biasing the bolt into the operative position;
5. a cam mounted on the axle within said recess for engaging and moving the bolt to its inoperative position against the spring bias upon rotation of the cylinder in the forward position thereof;
6. spring means mounted about the axle between the cylinder and the bolt for resiliently biasing the cylinder into the rear position away from the bolt;
7. a pawl means mounted about the axle,
   a. the recess in the bolt having a portion so dimensioned as to receive the pawl means when the bolt is in its inoperative position and when the cylinder is in its forward position; and
8. latch means preventing axial movement of the cylinder from its forward position when the key is inserted into the key slot, said latch means comprising
   a. a fixed bearing sleeve interposed between the lock cylinder and the housing, the sleeve having an inner arcuate groove adjacent the rear end of the cylinder, and
   b. a transverse slide mounted for radial movement in the lock cylinder rear end, the slide being formed so as normally to obstruct insertion of the key into the key slot until the slide snaps over the end of the fixed bearing sleeve and enters into the groove thereof upon axial movement of the cylinder into the forward position thereof, thereafter permitting full insertion of the key, and the fully inserted key maintaining the transverse slide securely within the groove to latch the cylinder in its forward position and maintain the pawl means in engagement with the bolt.

13. The ignition and steering mechanism lock of claim 12, further comprising a collar mounted on the lock cylinder and keyed thereto for conjoint rotation and relative axial movement, the cam being fixed on the collar.

14. The ignition and steering mechanism lock of claim 12, comprising second spring means coaxial with the first-mentioned spring means for biasing the pawl means normally against the bolt.

15. The ignition and steering mechanism of claim 12, further comprising a radially extending pin on the cylinder, and the bearing sleeve defining a shaped groove permitting axial and rotational movement between the cylinder and bearing sleeve.

16. A combined ignition and steering mechanism lock for an automotive vehicle with an ignition switch movable between a locked open position and at least one closed position, comprising
1. a housing;
2. a lock cylinder mounted for rotation in the housing about an axis of the cylinder, the lock cylinder having
   a. a forward end,
   b. a rear end,
   c. a collar at the rear end and radially extending from the cylinder,
   d. a radial gap in the collar,
   e. a key slot extending axially through the collar and rear end towards the forward end of the cylinder for receiving a key, the radial gap being in communication with the key slot, and
   f. a axle extending forwardly of the forward end and rotatable therewith to operate the ignition switch;
3. a bolt disposed adjacent the cylinder and movable parallel to the cylinder axis between an operative position wherein it engages and arrests the steering mechanism and an inoperative position wherein it is disengaged therefrom;
4. spring means normally biasing the bolt into the operative position;
5. cam means on the periphery of the lock cylinder for moving the bolt against the bias of the spring means upon rotation of the cylinder into the inoperative position;
6. a pivotal pawl mounted at a rear end of the bolt adjacent the rear end of the cylinder and arranged for engagement with the collar and to snap thereover in the inoperative position of the bolt to hold the bolt in the inoperative position,
   a. the radial gap in the collar permitting withdrawal of the pawl from engagement therewith on rotation of the cylinder through a predetermined angle;
7. a transverse slide mounted for radial movement in the gap between the key slot and the pawl; and
8. spring means biasing the slide normally into the key slot,
   a. insertion of the key causing the slide to move out of the key slot into engagement with the pawl when the bolt is in the inoperative position to prevent the bolt from moving into its operative position when the cylinder is rotated the predetermined angle, and the removal of the key from the slot permitting the transverse slide to free the pawl and thus to permit the movement of the bolt into its operative position.

* * * * *